United States Patent
Naslund et al.

(10) Patent No.: US 11,897,619 B2
(45) Date of Patent: Feb. 13, 2024

(54) HEATING PROGNOSTICS SYSTEM FOR ICE PROTECTION SYSTEM

(71) Applicant: Rosemount Aerospace Inc., Burnsville, MN (US)

(72) Inventors: Brian Brent Naslund, Chanhassen, MN (US); Jeremy S. Burns, Farmington, MN (US); Matthew Webb, Lakeville, MN (US); Jason Lee Skoglund, New Hope, MN (US); Vincent R. LoPresto, Eagan, MN (US); Darren G. Jackson, Prior Lake, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 295 days.

(21) Appl. No.: 17/532,677

(22) Filed: Nov. 22, 2021

(65) Prior Publication Data

US 2023/0159172 A1     May 25, 2023

(51) Int. Cl.
  *B64D 15/20* (2006.01)
  *B64D 15/12* (2006.01)
  *B64D 45/00* (2006.01)

(52) U.S. Cl.
  CPC ............ *B64D 15/20* (2013.01); *B64D 15/12* (2013.01); *B64D 2045/0085* (2013.01)

(58) Field of Classification Search
  CPC ............ B64D 2045/0085; B64D 15/12; B64D 15/20; B64D 15/22
  See application file for complete search history.

(56) References Cited

U.S. PATENT DOCUMENTS

| | | | | |
|---|---|---|---|---|
| 5,317,915 A * | 6/1994 | Choisnet | ............... | B64D 15/20 |
| | | | | 73/178 H |
| 6,304,194 B1 * | 10/2001 | McKillip | ............... | B64D 15/20 |
| | | | | 340/963 |
| 7,398,182 B2 * | 7/2008 | Petit | ...................... | B64D 15/00 |
| | | | | 73/170.15 |
| 7,502,717 B2 * | 3/2009 | Elpern | ...................... | F02C 1/02 |
| | | | | 702/183 |
| 8,550,402 B2 * | 10/2013 | Houlihan | ............... | B64D 15/14 |
| | | | | 244/134 D |

(Continued)

FOREIGN PATENT DOCUMENTS

| | | |
|---|---|---|
| EP | 2692643 A2 | 2/2014 |
| EP | 3751292 A1 | 12/2020 |

OTHER PUBLICATIONS

Extended European Search Report dated Mar. 22, 2023, received for corresponding European Application No. 22208662.1, pp. 6.

*Primary Examiner* — Philip J Bonzell
*Assistant Examiner* — Michael B. Kreiner
(74) *Attorney, Agent, or Firm* — Kinney & Lange, P.A.

(57) ABSTRACT

A method of monitoring an ice protection system of a rotorcraft or an aircraft includes applying heat to rotating blades of the rotorcraft or the aircraft according to a heater duty cycle and determining an anticipated ice shed time for ice to shed from the rotating blades. Torque of the rotating blades is sensed, and an actual ice shed time for ice to shed from the rotating blades is determined based on the sensed torque. A status of the ice protection system is determined based on the anticipated ice shed time and the actual ice shed time, and the status of the ice protection system is output for consumption by a consuming system.

20 Claims, 4 Drawing Sheets

(56) References Cited

U.S. PATENT DOCUMENTS

| | | | |
|---|---|---|---|
| 8,779,945 B2* | 7/2014 | Flemming | G01C 23/005 |
| | | | 340/963 |
| 9,656,757 B2* | 5/2017 | Henze | B64D 15/12 |
| 9,666,051 B2* | 5/2017 | Rossotto | B64D 15/20 |
| 9,745,070 B2* | 8/2017 | Brouwers | B64D 15/14 |
| 9,957,053 B2* | 5/2018 | Almond | B64D 31/06 |
| 10,508,597 B2* | 12/2019 | Kalya | F01D 25/10 |
| 10,513,340 B2* | 12/2019 | Garnett | B64D 15/22 |
| 10,556,695 B2* | 2/2020 | Longley, Jr. | H05B 1/0236 |
| 10,710,732 B2* | 7/2020 | Aubert | B64D 15/22 |
| 10,908,132 B2* | 2/2021 | Jha | G01N 29/4427 |
| 11,117,670 B2* | 9/2021 | Shi | B64D 15/12 |
| 11,401,044 B2* | 8/2022 | Deiler | B64F 5/60 |
| 2006/0226292 A1* | 10/2006 | Houlihan | H05B 1/0236 |
| | | | 244/134 R |
| 2020/0379027 A1* | 12/2020 | Essawy | G01R 31/52 |
| 2021/0016886 A1* | 1/2021 | LoPresto | G01P 13/025 |
| 2021/0309376 A1* | 10/2021 | Carpino, II | H05B 3/06 |

* cited by examiner

HEATING PROGNOSTICS SYSTEM FOR ICE PROTECTION SYSTEM

BACKGROUND

The present disclosure relates to ice protection systems, and in particular, to a heating prognostics system for ice protection systems.

In flight, ice can accumulate on rotor blades of rotorcrafts and propellor blades of aircraft. Ice protection systems, or deicing systems, used on rotorcraft and aircraft include resistive heating elements on blades that are electrically heated to break the adhesive bond that forms between the accumulated ice and the surfaces of the blades. When the bond is broken, centrifugal force causes the accumulated ice to shed off of the blade. The resistive heating elements are controlled by a heater controller. Each blade is divided into separate heating zones, which allows for the power density delivered to each heating zone to vary. The heater controller switches power applied to each of the resistive heating elements in the blade.

Ice protection systems are monitored for failure by monitoring the voltage and/or current being applied to the resistive heating elements. If the voltage and/or current is within an expected range, the system is deemed to be functioning properly. If the voltage and/or current is outside of the expected range, the system is considered to have failed.

SUMMARY

A method of monitoring an ice protection system of a rotorcraft or an aircraft includes applying heat to rotating blades of the rotorcraft or the aircraft according to a heater duty cycle and determining an anticipated ice shed time for ice to shed from the rotating blades. Torque of the rotating blades is sensed, and an actual ice shed time for ice to shed from the rotating blades is determined based on the sensed torque. A status of the ice protection system is determined based on the anticipated ice shed time and the actual ice shed time, and the status of the ice protection system is output for consumption by a consuming system.

A method of monitoring an ice protection system of a rotorcraft or an aircraft includes sensing a liquid water content of air outside of the rotorcraft or the aircraft, sensing an outside air temperature, and sensing a voltage of the ice protection system. A heater duty cycle is determined based on the sensed liquid water content and the sensed outside air temperature. Heat is applied to rotating blades of the rotorcraft or the aircraft according to the heater duty cycle. An anticipated ice shed time for ice to shed from the rotating blades is determined based on the sensed voltage and the sensed outside air temperature, and an actual ice shed time for ice to shed from the rotating blades is determined. A status of the ice protection system is determined based on the anticipated ice shed time and the actual ice shed time, and the status of the ice protection system is output for consumption by a consuming system.

DETAILED DESCRIPTION

Figure 1:
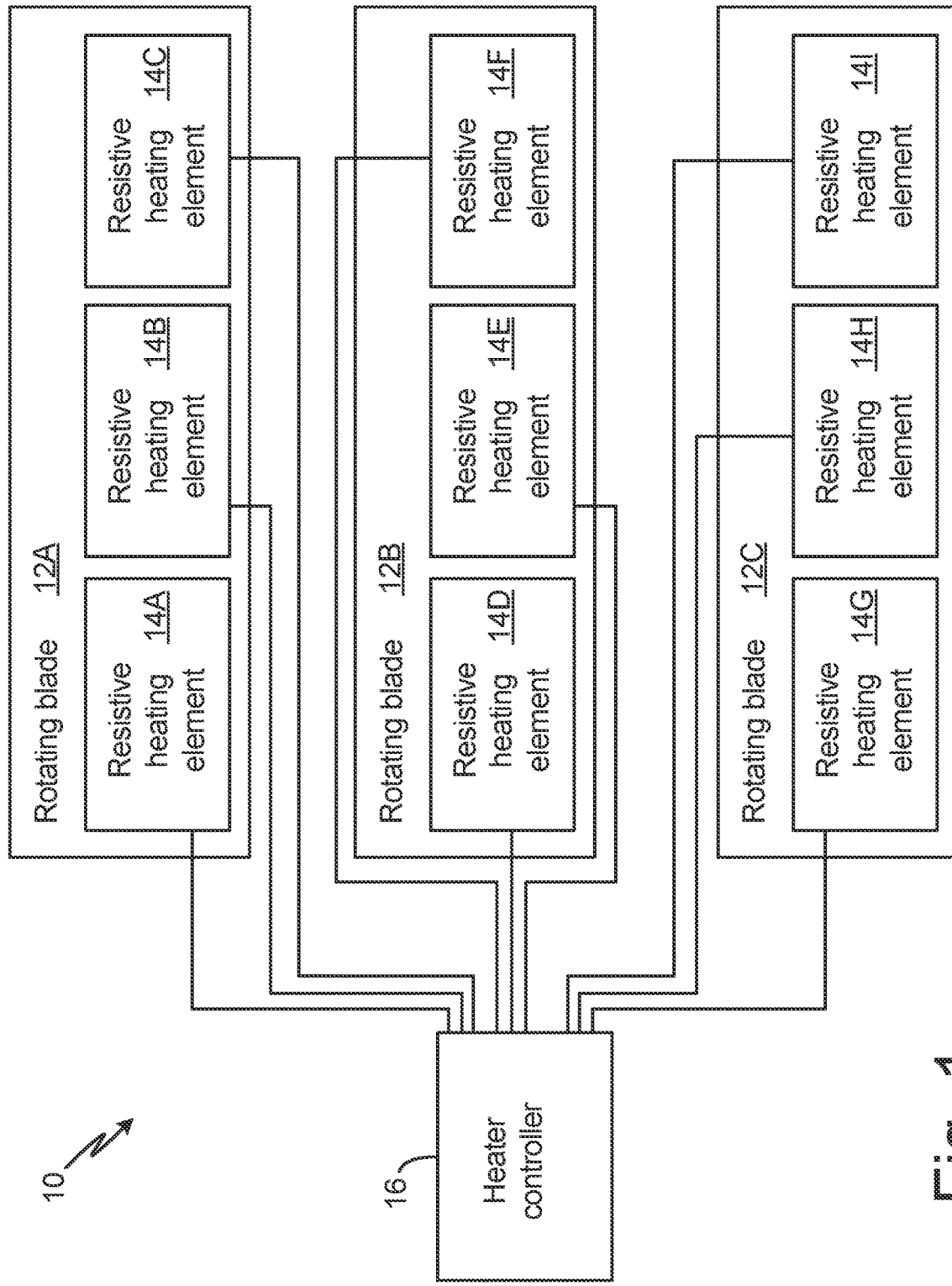
FIG. 1 is a schematic block diagram of an ice protection system.

FIG. 1 is a schematic block diagram of ice protection system 10. Ice protection system 10 includes rotating blades 12A-12C, resistive elements 14A-14I, and heater controller 16.

Ice protection system 10 is one example of an ice protection system that can be used to protect rotor blades of a rotorcraft or propellor blades of an aircraft from icing. Ice protection system 10 can also be referred to as a deicing system. Ice protection system 10 is shown as including three rotating blades 12A-12C in the embodiment shown in FIG. 1, but can include any number of rotating blades in alternate embodiments. Rotating blades 12A-12C can be rotor blades or propellor blades.

Resistive heating elements 14A-14I are positioned on rotating blades 12A-12C. Rotating blade 12A includes resistive heating elements 14A-14C. Rotating blade 12A can include heating zones and each of resistive heating elements 14A-14C can be positioned in a different heating zone. Rotating blade 12B includes resistive heating elements 14D-14F. Rotating blade 12B can include heating zones and each of resistive heating elements 14D-14F can be positioned in a different heating zone. Rotating blade 12C includes resistive heating elements 14G-14I. Rotating blade 12C can include heating zones and each of resistive heating elements 14G-14I can be positioned in a different heating zone. In some embodiments, each heating zone on rotating blades 12A-12C can include one or more resistive heating elements.

Ice protection system 10 also includes heater controller 16, which controls the heat application to each of resistive heating elements 14A-14I. Heater controller 16 can apply a different power level to each of resistive heating elements 14A-14I and can switch the power on and off to each of resistive heating elements 14A-14I.

Resistive heating elements 14A-14I are heated to shed ice built up on surfaces of rotating blades 12A-12C. Heater controller 16 controls resistive heating elements 14A-14I according to a heater duty cycle that is determined based on flight conditions. The resistive heating elements 14A-14I are cycled off to allow ice to form on rotating blades 12A-12C. Once enough ice has formed on rotating blades 12A-12C, resistive heating elements 14A-14I are cycled on for a period of time to break up the bond between the ice and the surfaces of rotating blades 12A-12C. When the bond is broken, the ice can shed off of rotating blades 12A-12C using centrifugal forces as rotating blades 12A-12C rotate. The off time and on time of the heater duty cycle is determined based on flight conditions.

Prior art ice protection systems were monitored for failure by sensing a voltage and/or current being applied to the ice protection system and determining whether the sensed voltage and/or current are within set tolerances. If the voltage and/or current is outside of the set tolerances, then the ice protection system is considered to have failed. Prior art ice protection systems do not detect or account for degradation of the ice protection system or other factors that could influence the ability to deice the rotating blades. Maintenance is scheduled at set intervals or when a failure is detected, but little to no forewarning is available to an operator or crew when an ice protection system is degrading to the point of impacting performance of the ice protection system or nearing failure.

A heater prognostics system according to the present disclosure is disclosed in detail below with reference to FIGS. 2-4. The heater prognostics system can monitor and analyze the behavior of ice protection system 10 and provide useful information about performance effectiveness and alert information relating to degradation and pending failure of ice protection system 10. The heater prognostics system uses the availability of rotorcraft or aircraft information and environmental information sensed by sensors on the rotorcraft or aircraft that can be correlated to prognostics data.

A series of processes can be undergone to determine a status of ice protection system 10. As will be discussed with reference to FIG. 2 below, heater duty cycle system 20 determines a heater duty cycle that is sent to heater controller 16, which uses the information to cycle resistive heating elements 14A-14I on and off based on the determined heater duty cycle. As will be discussed with reference to FIG. 3 below, failure check system 30 determines an actual power application and then compares the actual power application to a power application command being sent to ice protection system 10. Failure check system 30 shown in FIG. 3 is optional and can be undertaken to determine whether ice protection system 10 has failed. As will be discussed with reference to FIG. 4 below, heater prognostics system 50 determines an anticipated ice shed time and an actual ice shed time, and then determines a status of ice protection system 10 based on the anticipated ice shed time to the actual ice shed time. The status of ice protection system 10 or a control command can then be sent to consuming systems. Prognostics data for each deicing event is also sent to and stored in a memory. Prognostics data stored over a period of time, such as multiple flights or multiple years, is analyzed to determine an overall health of ice protection system 10. The ability to proactively detect and maintain ice protection system 10 not only improves the operational availability of the rotorcraft or aircraft, but it also improves its safety when operating in adverse environments.

Figure 2:
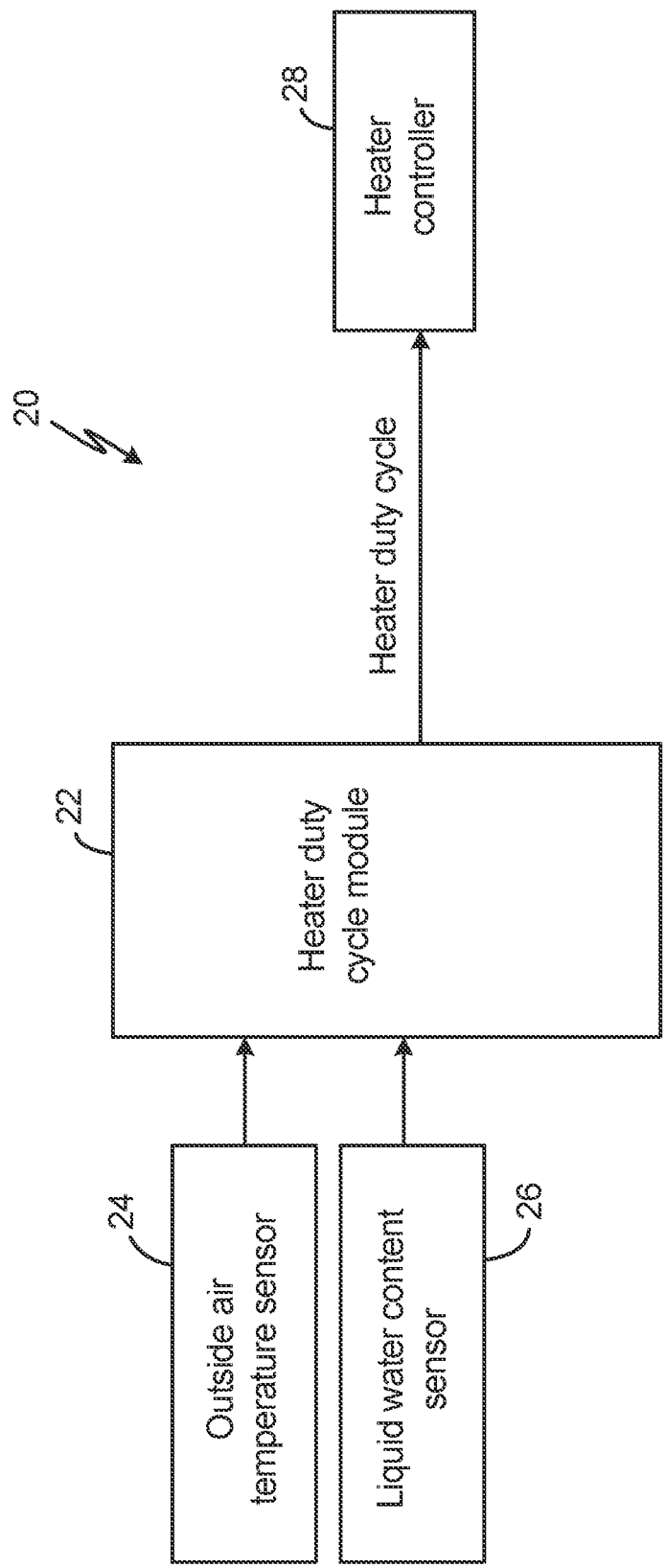
FIG. 2 is a schematic block diagram of a heater duty cycle system for the ice protection system.

FIG. 2 is a schematic block diagram of heater duty cycle system 20 for ice protection system 10. Heater duty cycle system 20 includes heater duty cycle module 22, outside air temperature sensor 24, liquid water content sensor 26, and heater controller 28.

Heater duty cycle system 20 can be used with ice protection system 10 or any other ice protection system. Heater duty cycle system 20 includes heater duty cycle module 22 that determines a heater duty cycle for ice protection system 10. Heater duty cycle module 22 is electrically coupled to outside air temperature sensor 24 and to liquid water content sensor 26. Heater duty cycle module 22 receives a sensed outside air temperature signal from outside air temperature sensor 24 and a sensed liquid water content signal from liquid water content sensor 26.

Outside air temperature sensor 24 can be any sensor that is capable of sensing an outside air temperature outside of the rotorcraft or aircraft. For example, outside air temperature sensor 24 can be a platinum resistance thermometer that sticks out of the side of an airframe to sense an outside air temperature. Outside air temperature sensor 24 sends the sensed outside air temperature signal to heater duty cycle module 22.

Liquid water content sensor 26 can be any sensor that is capable of sensing a liquid water content of the air outside of the rotorcraft or the aircraft. Liquid water content is a sense of the amount of liquid water in the volume of air that the rotorcraft or aircraft is flying through, which is a sense of how severe the icing condition is that the rotorcraft or aircraft is flying through. Liquid water content sensor 26 can, for example, be a magnetostrictive ice detector. The magnetostrictive ice detector includes a vibrating beam. As ice accumulates on the vibrating beam, the vibration frequency of the vibrating beam changes. Liquid water content can be determined based on the rate of change of the vibration frequency of the vibrating beam and an airspeed of the rotorcraft or aircraft. Liquid water content sensor 26 sends the sensed liquid water content signal to heater duty cycle module 22.

Heater duty cycle module 22 uses the sensed outside air temperature and the sensed liquid water content to determine a heater duty cycle for ice protection system 10. The outside air temperature is used to determine how long the resistive heating elements need to be on to break the bond between the ice and the surfaces of the rotating blades. As the outside air temperature gets colder, the bond between the ice and the surfaces of the rotating blades will get stronger and the resistive heating elements will need to be turned on for longer periods of time to break the bond. The liquid water content is used to determine how long the resistive heating elements need to be off for ice to accumulate on the rotating blades. If the resistive heating elements are turned on before enough ice accumulates on the rotating blades, the ice will fragment and not properly shed off of the rotating blades. The liquid water content is used to determine how long the resistive heating elements should remain off so that enough ice accumulates on the rotating blades to properly shed the ice.

Optionally, heater duty cycle system 20 can include an airspeed sensor electrically coupled to heater duty cycle module 22. The airspeed sensor can sense an airspeed of the rotorcraft or aircraft. The airspeed sensor can send the sensed airspeed to heater duty cycle module 22. Heater duty cycle module 22 can use the airspeed to help determine how long it takes ice to accumulate on the rotating blades. As the airspeed increases, ice will more quickly accumulate on the rotating blades. As the airspeed decreases, ice will take longer to accumulate on the rotating blades.

Heater duty cycle module 22 is electrically coupled to heater controller 28. Once heater duty cycle module 22 has determined a heater duty cycle, a heater duty cycle signal is sent to heater controller 28. The heater duty cycle signal tells heater controller 28 how long to cycle the resistive heating elements on and off. The heater duty cycle signal can also include power application commands regarding what current, voltage, and/or power to apply to ice protection system 10. The current, voltage, and/or power being applied to ice protection system 10 can vary for each separate resistive heating element, for each heating zone, or for each rotating blade, depending on the anticipated ice build up.

The heater duty cycle determined by heater duty cycle module 22 can also be sent to other components on the rotorcraft or aircraft, as will be discussed in more detail below with respect to FIGS. 3-4.

Figure 3:
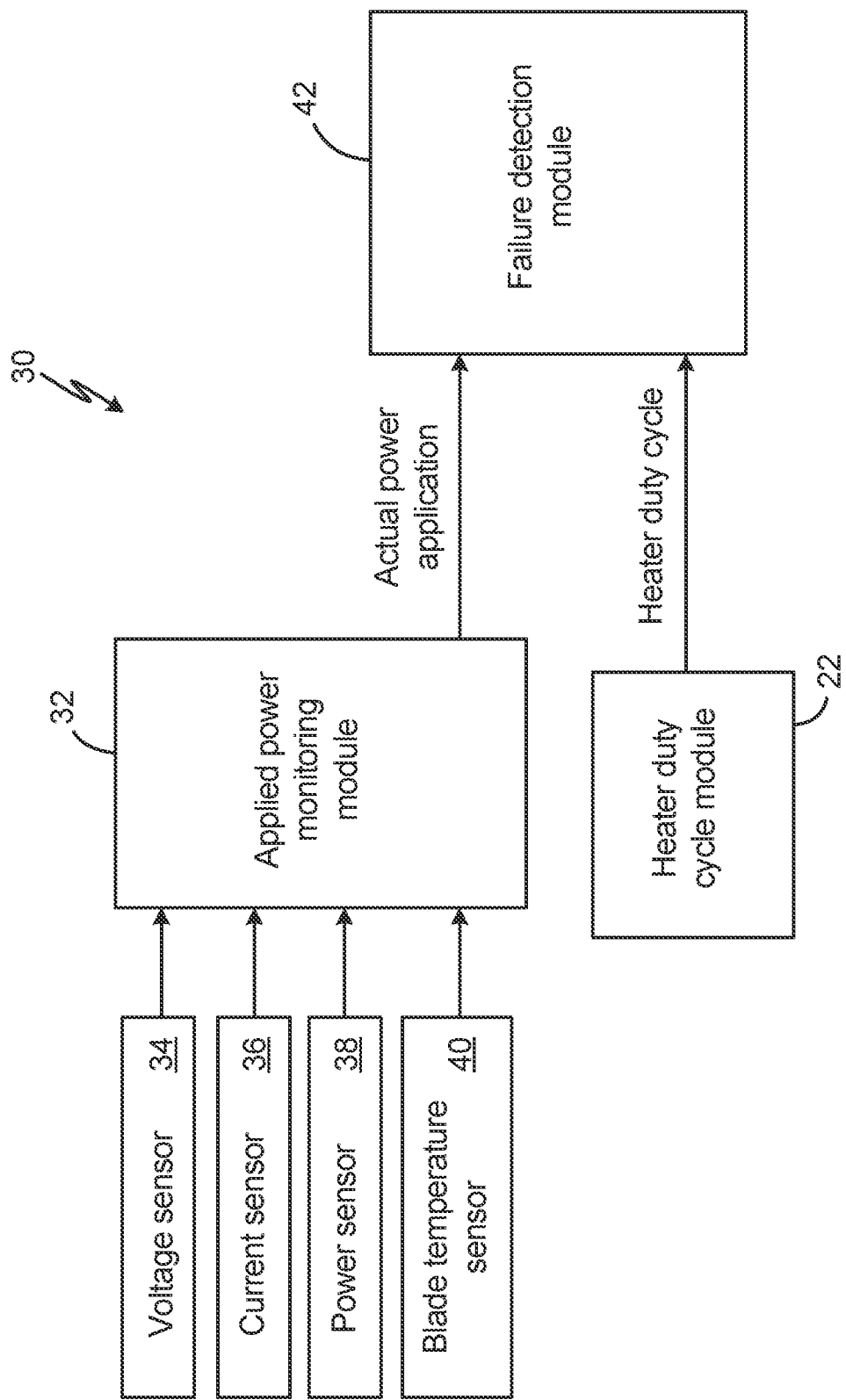
FIG. 3 is a schematic block diagram of a failure check system for the ice protection system.

FIG. 3 is a schematic block diagram of failure check system 30 for ice protection system 10. Failure check system 30 includes applied power monitoring module 32, voltage sensor 34, current sensor 36, power sensor 38, blade temperature sensor 40, and fault detection module 42. FIG. 3 also shows heater duty cycle module 22.

Failure check system 30 can be used with an ice protection system, for example ice protection system 10 or any other ice protection system. Failure check system 30 is optional and checks for failure of ice protection system 10. Failure check system 30 includes applied power monitoring module 32 that determines an actual power application of ice protection system 10. In the embodiment shown in FIG. 1, applied power monitoring module 32 is electrically coupled to voltage sensor 34, current sensor 36, power sensor 38, and blade temperature sensor 40. In alternate embodiments, applied power monitoring module 32 can include only one or any combination of voltage sensor 34, current sensor 36, power sensor 38, and/or blade temperature sensor 40. Applied power monitoring module 32 receives a sensed voltage signal from voltage sensor 34, a sensed current signal from current sensor 36, a sensed power signal from power sensor 38, and/or a sensed blade temperature signal from blade temperature sensor 40.

Voltage sensor 34 can be any sensor that is capable of sensing a voltage that is being applied to ice protection system 10. For example, voltage sensor 34 can be a sensor positioned along the wiring of ice protection system 10. Voltage sensor 34 sends the sensed voltage signal to applied power monitoring module 32.

Current sensor 36 can be any sensor that is capable of sensing a current that is being applied to ice protection system 10. For example, current sensor 36 can be a sensor positioned along the wiring of ice protection system 10. Current sensor 36 sends the sensed current signal to applied power monitoring module 32.

Power sensor 38 can be any sensor that is capable of sensing a power that being applied to ice protection system 10. For example, power sensor 38 can be a sensor positioned along the wiring of ice protection system 10. Power sensor 38 sends the sensed power signal to applied power monitoring module 32.

Blade temperature sensor 40 can be any sensor that is capable of sensing a temperature of the rotating blades. For example, blade temperature sensor can be a sensor positioned on or near a surface of the rotating blades. Blade temperature sensor 40 sends the sensed blade temperature signal to applied power monitoring module 32.

Applied power monitoring module 32 uses at least one of the sensed voltage, the sensed current, the sensed power, and/or the sensed blade temperature to determine an actual power application of ice protection system 10. The actual power application can be represented by the sensed voltage, the sensed current, the sensed power, and/or any combination thereof. Further, the sensed blade temperature can be used to determine if and how the sensed voltage, the sensed current, and/or the sensed power are being impacted by present flight conditions.

Applied power monitoring module 32 is electrically coupled to fault detection module 42. Once applied power monitoring module 32 has determined an actual power application, an actual power application signal is sent to fault detection module 42. Heater duty cycle module 22, discussed above with respect to FIG. 1, is also electrically coupled to fault detection module 42. Once heater duty cycle module 22 has determined a heater duty cycle, a heater duty cycle signal is sent to fault detection module 42. In addition to the on time and off time cycle, the heater duty cycle includes power application commands that include the voltage, the current, and/or the power that is to be applied to ice protection system 10. Fault detection module 42 compares the actual power application to the power application commands from the heater duty cycle. For example, the actual power application can include a sensed current that is being applied to ice protection system 10 that can be compared to the current that was sent to ice protection system 10 as part of the heater duty cycle commands. If the actual power application is outside of a preset threshold, ice protection system 10 is considered to have failed. Fault detection module 42 can output a signal indicating that ice protection system 10 has failed. If the actual power application is within the preset threshold, ice protection system 10 has not failed. The threshold is set in fault detection module 42 based on the power application commands from the heater duty cycle and can include a predetermined value or percentage that the actual power application has to be outside of with respect to the power application commands for ice protection system 10 to have failed.

Fault detection module system 30 disclosed in FIG. 3 is optional and is used to determine a failure or non-failure state of ice protection system 10. Fault detection module system 30 does not provide an indication of the health of ice protection system. Heater prognostics system 50, as discussed below with respect to FIG. 4, is used to analyze whether ice protection system 10 has experienced any degradation. Heater prognostics system 50 discussed below with respect to FIG. 4 can be utilized without utilizing fault detection module system 30.

Figure 4:
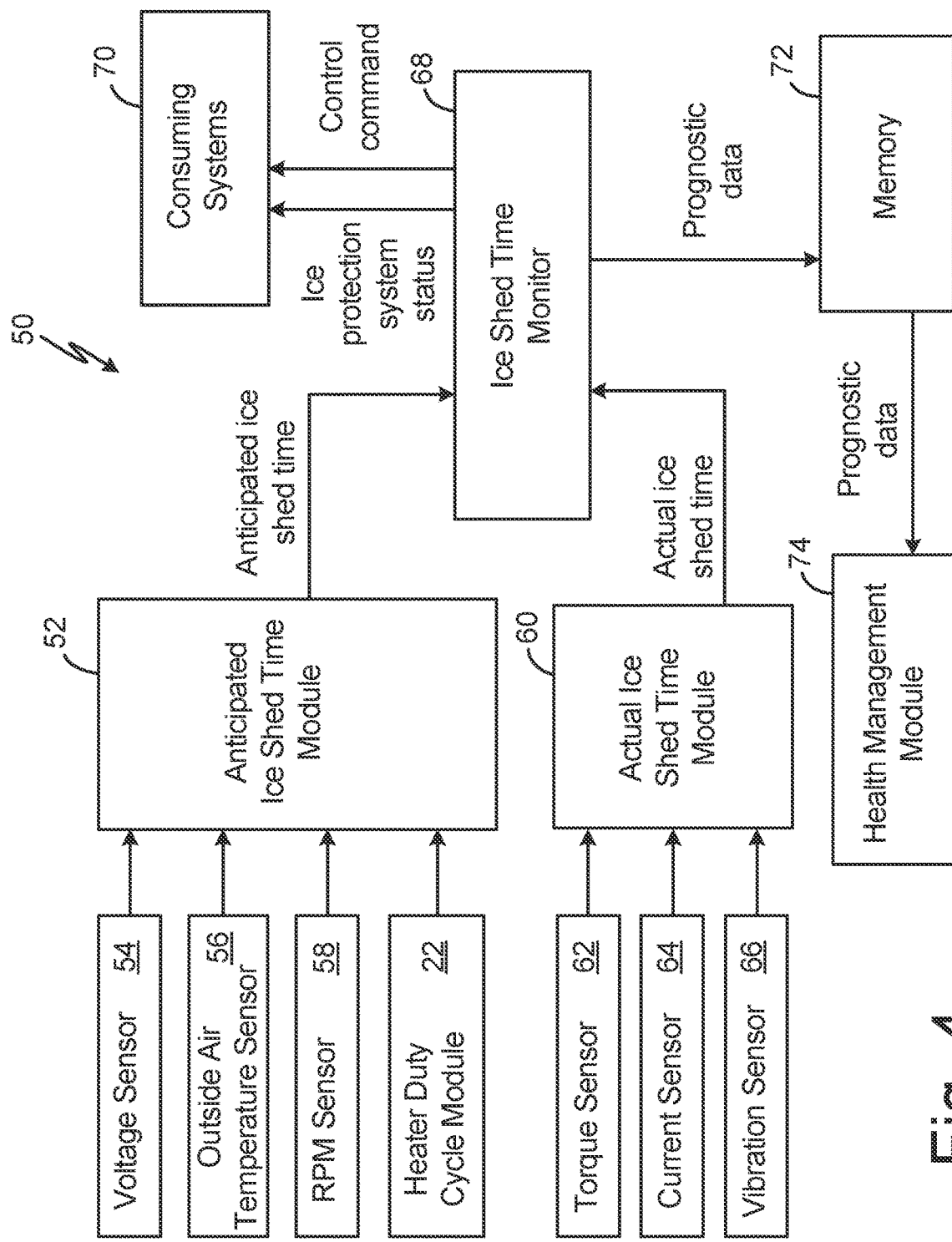
FIG. 4 is a schematic block diagram of a heating prognostics system for the ice protection system.

FIG. 4 is a schematic block diagram of heater prognostics system 50 for ice protection system 10. Heater prognostics system 50 includes anticipated ice shed time module 52, voltage sensor 54, outside air temperature sensor 56, revolutions per minute (RPM) sensor 58, actual ice shed time module 60, torque sensor 62, current sensor 64, vibration sensor 66, ice shed time monitor 68, consuming systems 70, memory 72, and health management module 74.

Heater prognostics system 50 can be used with an ice protection system, for example ice protection system 10 or any other ice protection system. Heater prognostics system 50 includes anticipated ice shed time module 52 that determines an anticipated ice shed time, which is the time it will take for ice to shed off of the rotating blades after the resistive heating elements have been turned on. Anticipated ice shed time module 52 is electrically coupled to one or more of voltage sensor 54, outside air temperature sensor 56, RPM sensor 58, and/or heater duty cycle module 22, which is discussed above in reference to FIG. 2. Anticipated ice shed time module 52 receives one or more of a sensed voltage signal from voltage sensor 54, a sensed outside air temperature from outside air temperature sensor 56, and/or a sensed RPM signal from RPM sensor 58. Anticipated ice shed time module 52 further can receive the heater duty cycle signal from heater duty cycle module 22.

Voltage sensor 54 can be any sensor that is capable of sensing a voltage that is being applied to ice protection system 10. For example, voltage sensor 54 can be a sensor positioned along the wiring of ice protection system 10. Voltage sensor 54 sends the sensed voltage signal to anticipated ice shed time module 52.

Outside air temperature sensor 56 can be any sensor that is capable of sensing an outside air temperature outside of the rotorcraft or aircraft. For example, outside air temperature sensor 56 can be a platinum resistance thermometer that sticks out of the side of an airframe to sense an outside air temperature. Outside air temperature sensor 56 sends the sensed outside air temperature signal to anticipated ice shed time module 52.

RPM sensor 58 can be any sensor that is capable of sensing an RPM of the rotating blades. For example, RPM sensor 58 can be a sensor positioned on a shaft supporting the rotating blades, a gear of the rotating blades, or the rotating blades that senses an RPM (the number of revolutions per minute) of the rotating blades. RPM sensor 58 sends the sensed RPM signal to anticipated ice shed time module 52.

Anticipated ice shed time module 52 uses one or more of the sensed voltage, the sensed outside air temperature, the sensed RPM, and/or the heater duty cycle to determine an anticipated ice shed time. The anticipated ice shed time can be based on how much ice has accumulated on the rotating blades, how long it takes to melt the bond between the ice and the surfaces of the rotating blades, and how long it will take to shed the ice from the rotating blades once the bond between the ice and the surfaces of the rotating blades has melted.

The sensed voltage can be used to determine how long it will take for the bond between the ice and surfaces of the rotating blades to melt. The resistive heating elements of ice protection system 10 are assumed to have a fixed resistance when they are functioning properly, so the sensed voltage will indicate an expected power application to the resistive heating elements. As the sensed voltage increases, the expected power being applied to the rotating blades increases and the time it will take to melt the bond between the ice and the surfaces of the rotating blades will decrease. As the sensed voltage decrease, the expected power being applied to the rotating blades decreases and the time it will take to melt the bond between the ice and the surfaces of the rotating blades will increase. An increase in the time it takes to melt the bond between the ice and the surfaces of the rotating blades will increase the anticipated ice shed time. A decrease in the time it takes to melt the bond between the ice and the surfaces of the rotating blades will decrease the anticipated ice shed time.

The sensed outside air temperature can also be used to determine how long it will take for the bond between the ice and surfaces of the rotating blades to melt. As the sensed outside air temperature decreases, the time it will take to melt the bond between the ice and the surfaces of the rotating blades will increase. As the sensed outside air temperature increases, the time it will take to melt the bond between the ice and the surfaces of the rotating blades will decrease. An increase in the time it takes to melt the bond between the ice and the surfaces of the rotating blades will increase the anticipated ice shed time. A decrease in the time it takes to melt the bond between the ice and the surfaces of the rotating blades will decrease the anticipated ice shed time.

The sensed RPM can be used to determine how long it will take to shed the ice from the rotating blades after the bond between the ice and the surfaces of the rotating blades has melted. The sensed RPM is a multivariable factor. As RPM increases, the anticipated ice shed time can go up or down depending on the other factors. An increase in RPM will make the blades more rigid and reduce the vibrations in the rotating blades and will thus increase the anticipated ice shed time, but an increase in RPM will also increase the airflow causing friction across the rotating blades and increase the centrifugal forces, and will thus decrease the anticipated ice shed time. A decrease in RPM will make the blades less rigid and increase the vibrations in the rotating blades and will thus decrease the anticipated ice shed time, but a decrease in RPM will also decrease the airflow causing friction across the rotating blades and decreases the centrifugal forces, and will thus increase the anticipated ice shed time. Whether an increase or a decrease in RPM will cause an overall increase or decrease of the anticipated ice shed time will depend on other factors, such as outside air temperature, sensed voltage, sensed current, and/or the heater duty cycle.

Some of the factors discussed above have a linear correlation to anticipated ice shed time, and others are dependent on a multivariable analysis of multiple factors. The overall analysis to determine the anticipated ice shed time is a multivariable analysis that can be based on one or more of the factors discussed above.

The heater duty cycle can be used by anticipated ice shed time module 52 as a bounds check for the determination being made by anticipated ice shed time module 52. If the anticipated ice shed time determined based on the sensed voltage, the second outside air temperature, and/or the sensed RPM is greater than the on time of the heater duty cycle, or greater than a set threshold over the on time of the heater duty cycle, anticipated ice shed time module 52 can determine that there is degradation and/or failure of ice protection system 10.

Heater prognostics system 50 further includes actual ice shed time module 60 that determines the actual ice shed time, which is the time it takes for ice to shed off of the rotating blades after the resistive heating elements have been turned on. Actual ice shed time module 60 is electrically coupled to one or more of torque sensor 62, current sensor 64, and/or vibration sensor 66. Actual ice shed time module 60 receives one or more of a sensed torque signal from torque sensor 62, a sensed current signal from current sensor 64, and/or a sensed vibration signal from vibration sensor 66.

Torque sensor 62 can be any sensor that is capable of sensing a torque of the rotating blades. For example, torque sensor 62 can be a sensor positioned in an engine controlling rotation of the rotating blades, on a shaft supporting the rotating blades, a gear of the rotating blades, or on the rotating blades that senses a signal representative of a torque of the rotating blades. Torque sensor 62 sends the sensed torque signal to actual ice shed time module 60.

Current sensor 64 can be any sensor that is capable of sensing a current that is being applied to ice protection system 10. For example, current sensor 64 can be a sensor positioned along the wiring of ice protection system 10. Current sensor 64 sends the sensed current signal to actual ice shed time module 60.

Vibration sensor 66 can be any sensor that is capable of sensing a vibration of the rotating blades. For example, vibration sensor 66 can be a sensor positioned on the rotating blades that senses a vibration of the rotating blades. Vibration sensor 66 sends the sensed vibration signal to actual ice shed time module 60.

The sensed torque is used to determine the time it takes for ice to shed off of the rotating blades. As ice accumulates on the rotating blades, the torque begins to increase due to the increase weight of the rotating blades. As the resistive heating elements of ice protection system 10 are cycled on and the ice is shed from the rotating blades, the sensed torque decreases.

For example, if a rotating blade includes three different heating zones that each have one or more resistive heating elements, the one or more resistive heating elements can be turned on in series. Before ice is accumulated on the rotating blade, a baseline torque can be determined. As ice accumulates on the rotating blade, the torque will increase. As the one or more resistive heating elements in the first heating zone are turned on, the ice is shed from the first heating zone and the sensed torque will drop a bit. As the one or more resistive heating elements in the second heating zone are turned on, the ice is shed from the second heating zone and the sensed torque will drop a bit further. As the one or more resistive heating elements in the third heating zone are turned on, the ice is shed from the third heating zone and the sensed torque will drop back to the baseline torque.

The sensed current can be used in conjunction with the sensed torque to determine when the ice sheds off of the rotating blades. As ice protection system 10 applies power to the resistive heating elements, the current being applied to the resistive heating elements may contribute to a rise in torque of the rotating blades. The sensed current can be used to cancel out the effect of the applied current on the sensed torque.

Alternatively, or in combination with the sensed torque and/or the sensed current, the sensed vibration can be used to determine the time it takes for ice to shed off of the rotating blades. As ice sheds from the rotating blades, there is a momentary vibration in the rotating blades due to the sudden change in torque of and mass on the rotating blades. These momentary vibrations can be sensed and used to determine how long it took for ice to shed off of the rotating blades based on the time between when the resistive heating elements were turned on and when the momentary vibrations were sensed. The momentary vibrations can be sensed for each separate heating zone on the rotating blades. The actual ice shed time can be determined based on one or more of the sensed torque, the sensed current, and/or the sensed vibrations. For each heating zone, the actual ice shed time can be determined by sensing the time from when the resistive heating elements are turned on to when the sensed torque drops and/or when the sensed momentary vibrations occur.

Heater prognostics system 50 also includes ice shed time monitor 68, which is electrically coupled to anticipated ice shed time module 52 and actual ice shed time module 60. Anticipated ice shed time module 52 sends the determined anticipated ice shed time to ice shed time monitor 68, and actual ice shed time module 60 sends the determined actual ice shed time to ice shed time monitor 68. Ice shed time monitor 68 compares the anticipated ice shed time to the actual ice shed time to determine a status of ice protection system 10. If the actual ice shed time is longer than the anticipated ice shed time, it indicates degradation of ice protection system 10.

A preset threshold is set in ice shed time monitor 68. The preset threshold can be a value or percentage that the actual ice shed time is away from the anticipated ice shed time before degradation is considered to have occurred. The preset threshold can vary based on the liquid water content and the outside air temperature. If the actual ice shed time is within the preset threshold, ice protection system 10 is determined to be in a nondegraded state. If the actual ice shed time is outside of the preset threshold, ice protection system 10 is determined to be in a degraded state.

Ice shed time monitor 68 is electrically coupled to one or more consuming system(s) 70. Ice shed time monitor 68 can send an ice protection system status to consuming system(s) 70 for consumption by consuming system(s) 70. The ice protection system status can be an indication of whether ice protection system 10 is in a nondegraded or degraded state. If ice protection system 10 is in a degraded state, ice shed time monitor 68 can generate an alert that ice protection system 10 is degrading that can be sent to consuming system(s) 70.

Consuming system 70 can be, for example, an electronic flight instrument system (EFIS) in the rotorcraft or aircraft, and the ice protection system status can be an alert to the pilot or crew that maintenance is needed due to degradation of ice protection system 10. Further, if the rate of degradation is great enough and ice protection system 10 is about to fail, ice shed time monitor 68 can generate and send an alert to the EFIS to exit icing conditions immediately. These alerts can take the form of a master warning or master caution indicator on the EFIS. Consuming system 70 can also be a ground system and the ice protection system status can be an alert to maintenance crew that maintenance is needed due to degradation of ice protection system 10. Consuming system 70 can further be any crew alerting system that is capable of receiving an alert that maintenance is needed due to degradation of ice protection system 10. Once an alert is received, maintenance can be scheduled to inspect, repair, or replace components, such as the resistive heating elements, the wiring, or the rotating blades, of ice protection system 10.

Further, consuming system 70 can be a data concentrator unit (DCU) that receives the ice protection system status. The ice protection system status can be sent to any of consuming system(s) 70 via a databus, such as ARINC 429 or other protocols.

Ice shed time monitor 68 can also generate a control command that can be sent to consuming system(s) 70. The control command can be a command to automatically take an action if ice protection system 10 is in a degraded state. The control command can also include a ice protection system status in some embodiments.

Ice shed time monitor 68 can send a control command to automatically schedule maintenance when ice protection system 10 has degraded. Ice shed time monitor 68 can also send a control command to the heater controller of ice protection system 10 to automatically adjust ice protection system 10. More specifically, if ice protection system 10 is determined to have degraded, ice shed time monitor 68 can send a control command to ice protection system 10 to increase a voltage, a current, or a power being applied to ice protection system 10.

Ice shed time monitor 68 is also electrically coupled to memory 72, and memory 72 is electrically coupled to health management module 74. Ice shed time monitor 68 sends prognostic data to memory 72, which stores the prognostics data and sends the prognostics data to health management module 74. The prognostics data is the comparison of the anticipated ice shed time to the actual ice shed time. The prognostics data is saved in memory 72 for each deicing event the rotorcraft or aircraft experiences. Health management module 74 analyzes the prognostics data over a period of time, such as multiple flights or multiple years, to determine if there is degradation to ice protection system 10. Even if the actual ice shed time is within the preset thresholds, analysis of the difference between the actual ice shed time and the anticipated ice shed time may indicate an elongation of the difference between the actual ice shed time and the anticipated ice shed time over the period of time being analyzed, which would indicate degradation of ice protection system 10. Health management module 74 can also analyze the prognostics data over time to determine remaining useful life.

Heater prognostics system 50 uses data already available on the rotorcraft or aircraft to monitor for degradation of heater prognostics system 50. Monitoring for degradation of heater prognostics system 50 allows for maintenance to be scheduled as needed to prevent failure of ice protection system 10. If ice protection system 10 fails, it can result in significant downtime of the rotorcraft or aircraft. Monitoring for degradation prevents failure of ice protection system 10. Further, heater prognostics system 50 analyzes the entire system performance versus a single component.

DISCUSSION OF POSSIBLE EMBODIMENTS

The following are non-exclusive descriptions of possible embodiments of the present invention.

A method of monitoring an ice protection system of a rotorcraft or an aircraft includes applying heat to rotating blades of the rotorcraft or the aircraft according to a heater duty cycle and determining an anticipated ice shed time for ice to shed from the rotating blades. Torque of the rotating blades is sensed, and an actual ice shed time for ice to shed from the rotating blades is determined based on the sensed torque. A status of the ice protection system is determined based on the anticipated ice shed time and the actual ice shed time, and the status of the ice protection system is output for consumption by a consuming system.

The method of the preceding paragraph can optionally include, additionally and/or alternatively, any one or more of the following features, configurations and/or additional components:

The method further includes sensing a liquid water content of air outside of the rotorcraft or the aircraft, sensing an outside air temperature, and determining the heater duty cycle based on the liquid water content and the outside air temperature.

The method further includes sensing at least one of a voltage of the ice protection system, a current of the ice protection system, a power of the ice protection system, or a blade temperature of the rotating blades; determining an actual power application based on at least one of the sensed voltage, the sensed current, the sensed power, and/or the sensed blade temperature; and determining if the ice protection system has failed based on the actual power application and the heater duty cycle.

Determining if the ice protection system has failed based on the actual power application and the heater duty cycle further includes setting a threshold that that the actual power application, based on at least one of the sensed voltage, the sensed current, or the sensed power, can be within based on power application comments from the heater duty cycle; and determining whether the actual power application is within the threshold; wherein if the actual power application is outside of the threshold, the ice protection system can output a signal indicating that the ice protection system has failed.

The method further includes sensing at least one of a voltage of the ice protection system, an outside air temperature, or an RPM of the rotating blades. The anticipated ice shed time is determined based on at least one of the sensed voltage, the sensed outside air temperature, or the sensed RPM.

The method further includes sensing a current of the ice protection system, wherein determining the actual ice shed time is based on the sensed torque and the sensed current.

Determining the status of the ice protection system based on the anticipated ice shed time and the actual ice shed time further includes setting a threshold that the actual ice shed time can be from the anticipated ice shed time, and determining if the actual ice shed time is within the threshold to determine if the ice protection system is in a nondegraded state or a degraded state.

Outputting the status of the ice protection system for consumption by the consuming system further includes generating an alert that the ice protection system is degrading and a pilot should exit icing conditions, and sending the alert to an electronic flight instrument system (EFIS) of the rotorcraft or the aircraft.

Outputting the status of the ice protection system for consumption by the consuming system further includes generating an alert that maintenance of the ice protection system is needed, and sending the alert to an electronic flight instrument system (EFIS) or maintenance system of the rotorcraft or the aircraft.

Outputting the status of the ice protection system for consumption by the consuming system further includes sending a control command to a heater controller of the ice protection system, and automatically adjusting a voltage, a current, or a power being applied to the ice protection system based on the control command.

The method further includes storing prognostic data for each deicing event in a memory, and analyzing the prognostic data for multiple deicing events to determine if there is degradation of the ice protection system.

A method of monitoring an ice protection system of a rotorcraft or an aircraft includes sensing a liquid water content of air outside of the rotorcraft or the aircraft, sensing an outside air temperature, and sensing a voltage of the ice protection system. A heater duty cycle is determined based on the sensed liquid water content and the sensed outside air temperature. Heat is applied to rotating blades of the rotorcraft or the aircraft according to the heater duty cycle. An anticipated ice shed time for ice to shed from the rotating blades is determined based on the sensed voltage and the sensed outside air temperature, and an actual ice shed time for ice to shed from the rotating blades is determined. A status of the ice protection system is determined based on the anticipated ice shed time and the actual ice shed time, and the status of the ice protection system is output for consumption by a consuming system.

The method of the preceding paragraph can optionally include, additionally and/or alternatively, any one or more of the following features, configurations and/or additional components:

The method further includes sensing at least one of a current of the ice protection system, a power of the ice protection system, or a blade temperature of the rotating blades; determining an actual power application based on at least one of the sensed voltage, the sensed current, the sensed power, or the sensed blade temperature; and determining if the ice protection system has failed based on the actual power application and the heater duty cycle. Determining if the ice protection system has failed based on the actual power application and the heater duty cycle further includes setting a threshold that that the actual power application, based on at least one of the sensed voltage, the sensed current, or the sensed power, can be within based on power application comments from the heater duty cycle; and determining whether the actual power application is within the threshold; wherein if the actual power application is outside of the threshold, the ice protection system can output a signal indicating that the ice protection system has failed.

The method further includes sensing an RPM of the rotating blades, wherein determining the anticipated ice shed time is based on at least one of the sensed voltage, the sensed outside air temperature, or the sensed RPM.

The method further includes sensing a torque of the rotating blades, sensing a current of the ice protection system, and/or sensing a vibration of the rotating blades, wherein determining the actual ice shed time is based on at least one of the sensed torque, the sensed current, or the sensed vibration.

Determining the status of the ice protection system based on the anticipated ice shed time and the actual ice shed time further includes setting a threshold that the actual ice shed time can be from the anticipated ice shed time, and determining if the actual ice shed time is within the threshold to determine if the ice protection system is in a nondegraded state or a degraded state.

Outputting the status of the ice protection system for consumption by the consuming system further includes generating an alert that the ice protection system is degrading and a pilot should exit icing conditions, and sending the alert to an electronic flight instrument system (EFIS) of the rotorcraft or the aircraft.

Outputting the status of the ice protection system for consumption by the consuming system further includes generating an alert that maintenance of the ice protection system is needed, and sending the alert to an electronic flight instrument system (EFIS) or maintenance system of the rotorcraft or the aircraft.

Outputting the status of the ice protection system for consumption by the consuming system further includes sending a control command to a heater controller of the ice protection system, and automatically adjusting a voltage, a current, or a power being applied to the ice protection system based on the control command.

The method further includes storing prognostic data for each deicing event in a memory, and analyzing the prognostic data for multiple deicing events to determine if there is degradation of the ice protection system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of monitoring an ice protection system of a rotorcraft or an aircraft, the method comprising:
    applying heat to rotating blades of the rotorcraft or the aircraft according to a heater duty cycle;
    determining an anticipated ice shed time for ice to shed from the rotating blades;
    sensing a torque of the rotating blades;
    determining an actual ice shed time for ice to shed from the rotating blades based on the sensed torque;
    determining a status of the ice protection system based on the anticipated ice shed time and the actual ice shed time; and
    outputting the status of the ice protection system for consumption by a consuming system.

2. The method of claim 1, and further comprising:
    sensing a liquid water content of air outside of the rotorcraft or the aircraft;
    sensing an outside air temperature; and
    determining the heater duty cycle based on the liquid water content and the outside air temperature.

3. The method of claim 2, and further comprising:
    sensing at least one of a voltage of the ice protection system, a current of the ice protection system, a power of the ice protection system, or a blade temperature of the rotating blades;
    determining an actual power application based on at least one of the sensed voltage, the sensed current, the sensed power, or the sensed blade temperature; and
    determining if the ice protection system has failed based on the actual power application and the heater duty cycle.

4. The method of claim 3, wherein determining if the ice protection system has failed based on the actual power application and the heater duty cycle further comprises:
    setting a threshold that that the actual power application, based on at least one of the sensed voltage, the sensed current, or the sensed power, can be within based on power application comments from the heater duty cycle; and
    determining whether the actual power application is within the threshold;
    wherein if the actual power application is outside of the threshold, the ice protection system can output a signal indicating that the ice protection system has failed.

5. The method of claim 1, and further comprising:
    sensing at least one of a voltage of the ice protection system, an outside air temperature, or an RPM of the rotating blades;
    wherein determining the anticipated ice shed time is based on at least one of the sensed voltage, the sensed outside air temperature, or the sensed RPM.

6. The method of claim 1, and further comprising:
    sensing a current of the ice protection system;
    wherein determining the actual ice shed time is based on the sensed torque and the sensed current.

7. The method of claim 1, wherein determining the status of the ice protection system based on the anticipated ice shed time and the actual ice shed time further comprises:
    setting a threshold that the actual ice shed time can be from the anticipated ice shed time; and
    determining if the actual ice shed time is within the threshold to determine if the ice protection system is in a nondegraded state or a degraded state.

8. The method of claim 1, wherein outputting the status of the ice protection system for consumption by the consuming system further comprises:
    generating an alert that the ice protection system is degrading and a pilot should exit icing conditions; and
    sending the alert to an electronic flight instrument system (EFIS) of the rotorcraft or the aircraft.

9. The method of claim 1, wherein outputting the status of the ice protection system for consumption by the consuming system further comprises:
    generating an alert that maintenance of the ice protection system is needed; and
    sending the alert to an electronic flight instrument system (EFIS) or maintenance system of the rotorcraft or the aircraft.

10. The method of claim 1, wherein outputting the status of the ice protection system for consumption by the consuming system further comprises:
    sending a control command to a heater controller of the ice protection system; and
    automatically adjusting a voltage, a current, or a power being applied to the ice protection system based on the control command.

11. The method of claim 1, and further comprising:
    storing prognostic data for each deicing event in a memory; and
    analyzing the prognostic data for multiple deicing events to determine if there is degradation of the ice protection system.

12. A method of monitoring an ice protection system of a rotorcraft or an aircraft, the method comprising:
    sensing a liquid water content of air outside of the rotorcraft or the aircraft;
    sensing an outside air temperature;
    sensing a voltage of the ice protection system;
    determining a heater duty cycle based on the sensed liquid water content and the sensed outside air temperature;

applying heat to rotating blades of the rotorcraft or the aircraft according to the heater duty cycle;

determining an anticipated ice shed time for ice to shed from the rotating blades based on the sensed voltage and the sensed outside air temperature;

sensing a torque of the rotating blades;

determining an actual ice shed time for ice to shed from the rotating blades based on the sensed torque;

determining a status of the ice protection system based on the anticipated ice shed time and the actual ice shed time; and outputting the status of the ice protection system for consumption by a consuming system.

13. The method of claim 12, and further comprising:

sensing at least one of a current of the ice protection system, a power of the ice protection system, or a blade temperature of the rotating blades;

determining an actual power application based on at least one of the sensed voltage, the sensed current, the sensed power, or the sensed blade temperature; and determining if the ice protection system has failed based on the actual power application and the heater duty cycle, wherein determining if the ice protection system has failed based on the actual power application and the heater duty cycle further comprises:

setting a threshold that that the actual power application, based on at least one of the sensed voltage, the sensed current, or the sensed power, can be within based on power application comments from the heater duty cycle; and determining whether the actual power application is within the threshold;

wherein if the actual power application is outside of the threshold, the ice protection system can output a signal indicating that the ice protection system has failed.

14. The method of claim 12, and further comprising:

sensing an RPM of the rotating blades;

wherein determining the anticipated ice shed time is based on at least one of the sensed voltage, the sensed outside air temperature, or the sensed RPM.

15. The method of claim 14, and further comprising:

sensing a current of the ice protection system; and/or sensing a vibration of the rotating blades;

wherein determining the actual ice shed time is also based on at least one of the the sensed current, and the sensed vibration.

16. The method of claim 15, wherein determining the status of the ice protection system based on the anticipated ice shed time and the actual ice shed time further comprises:

setting a threshold that the actual ice shed time can be from the anticipated ice shed time; and determining if the actual ice shed time is within the threshold to determine if the ice protection system is in a nondegraded state or a degraded state.

17. The method of claim 12, wherein outputting the status of the ice protection system for consumption by the consuming system further comprises:

generating an alert that the ice protection system is degrading and a pilot should exit icing conditions; and sending the alert to an electronic flight instrument system (EFIS) of the rotorcraft or the aircraft.

18. The method of claim 12, wherein outputting the status of the ice protection system for consumption by the consuming system further comprises:

generating an alert that maintenance of the ice protection system is needed; and sending the alert to an electronic flight instrument system (EFIS) or maintenance system of the rotorcraft or the aircraft.

19. The method of claim 12, wherein outputting the status of the ice protection system for consumption by the consuming system further comprises:

sending a control command to a heater controller of the ice protection system; and automatically adjusting a voltage, a current, or a power being applied to the ice protection system based on the control command.

20. The method of claim 12, and further comprising:

storing prognostic data for each deicing event in a memory; and analyzing the prognostic data for multiple deicing events to determine if there is degradation of the ice protection system.

* * * * *